US011703140B2

(12) United States Patent
Castrigno

(10) Patent No.: US 11,703,140 B2
(45) Date of Patent: *Jul. 18, 2023

(54) RELIEF VALVE WITH TESTING LOCKOUT

(71) Applicant: Watts Regulator Co., North Andover, MA (US)

(72) Inventor: Steven Castrigno, Chester, NH (US)

(73) Assignee: Watts Regulator Co., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,404

(22) Filed: Mar. 29, 2022

(65) Prior Publication Data

US 2022/0221072 A1  Jul. 14, 2022

Related U.S. Application Data

(63) Continuation-in-part of application No. 16/815,867, filed on Mar. 11, 2020, now Pat. No. 11,421,795.

(51) Int. Cl.
*F16K 17/06* (2006.01)
*F16K 17/04* (2006.01)

(52) U.S. Cl.
CPC ............ *F16K 17/06* (2013.01); *F16K 17/042* (2013.01); *F16K 17/0413* (2013.01); *F16K 2200/304* (2021.08); *Y10T 137/7888* (2015.04)

(58) Field of Classification Search
CPC . F16K 1/2042; F16K 1/36; F16K 7/17; F16K 15/025; F16K 15/033; F16K 15/035; F16K 15/063; F16K 15/14; F16K 15/141; F16K 15/144; F16K 15/145; F16K 15/18; F16K 15/181; F16K 15/185; F16K 17/0413; F16K 17/042; F16K 17/0486; F16K 17/06; F16K 31/563; F16K 2200/304;

(Continued)

(56) References Cited

U.S. PATENT DOCUMENTS 736,820 A * 8/1903 Collis ................. F16K 17/0413
                                                         137/535
944,809 A * 12/1909 McCarty ............. F16K 17/0413
                                                         137/535

(Continued)

OTHER PUBLICATIONS

AGF Manufacturing, Inc.; www.Inspectorstest_com; Sprinklers-Saves, Inspectors Test Vales Sell Sheet; 2008-2015, 5 pages.

(Continued)

*Primary Examiner* — Kevin F Murphy
*Assistant Examiner* — Jonathan J Waddy
(74) *Attorney, Agent, or Firm* — Day Pitney LLP; George N. Chaclas; Emily Ferriter Russo

(57) ABSTRACT

A relief valve has a valve body, a plunger assembly coupled to the valve body for selectively opening and closing the relief valve, and a support member secured to the valve body. A lockout lever is against the support member, forming a vertex. A spring rod is coupled to the lockout lever, and a spring is coupled to the spring rod, providing a bias force against the plunger assembly to normally close the relief valve. In a lockout position, the lockout lever is moved to pivot on the vertex against the support member to further compress the spring, which increases the bias force and, in turn, a cracking pressure of the relief valve.

12 Claims, 11 Drawing Sheets

(58) Field of Classification Search
CPC ......... Y10T 137/7879; Y10T 137/7887; Y10T 137/7888; Y10T 137/789; Y10T 137/7891; Y10T 137/7892
USPC ............ 137/115.18, 843, 851, 852, 854–859
See application file for complete search history.

(56) References Cited

U.S. PATENT DOCUMENTS

| | | |
|---|---|---|
| 2,634,748 A | 4/1953 | Morrison |
| 2,638,109 A | 5/1953 | Wahlmark |
| 2,827,921 A | 3/1958 | Sherman et al. |
| 4,140,436 A * | 2/1979 | Schumacher ...... G05D 16/2095 417/27 |
| 4,303,376 A | 12/1981 | Siekmann |
| 4,681,518 A | 7/1987 | Credle |
| 5,101,799 A | 4/1992 | Davis et al. |
| 5,117,798 A | 6/1992 | Nozaki |
| 5,588,462 A | 12/1996 | McHugh |
| 5,613,420 A | 3/1997 | Glockemann |
| 5,662,139 A | 9/1997 | Lish |
| 6,131,552 A | 10/2000 | Paielli et al. |
| 6,186,169 B1 | 2/2001 | McHugh |
| 6,341,622 B1 | 1/2002 | McHugh |
| 6,494,231 B1 | 12/2002 | Fetz et al. |
| 2004/0045604 A1 | 3/2004 | Dunmire et al. |
| 2016/0201814 A1 | 7/2016 | Chen et al. |
| 2017/0023141 A1 | 1/2017 | Andersson |
| 2017/0113083 A1 | 4/2017 | Ringer et al. |
| 2017/0146137 A1 | 5/2017 | Koelzer |
| 2018/0283563 A1 | 10/2018 | Goto et al. |

OTHER PUBLICATIONS

AGF Manufacturing, Inc.; www.testanddrain_com; Model 3011 Inspectors Test; Remote Inspector's Test; Aug. 2015; 2 pages.
AGF Manufacturing, Inc.; www.testanddrain_com; Pressure Relief Valves Sell Sheet for Model 7000 & Model 7200; Mar. 2017.

* cited by examiner

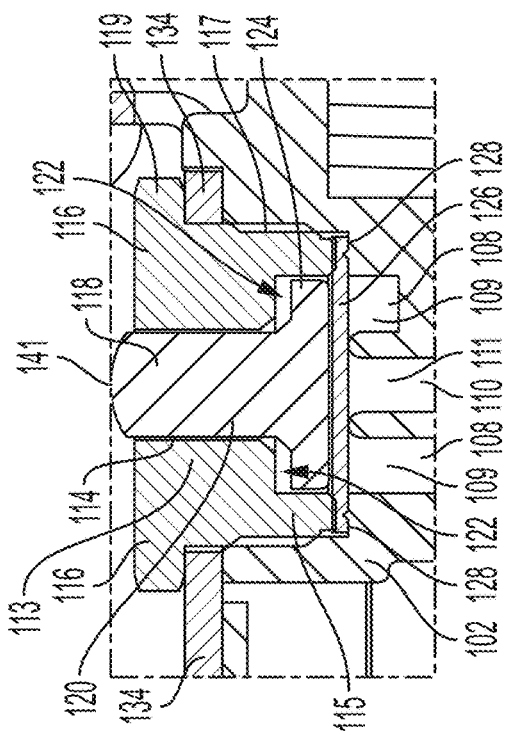
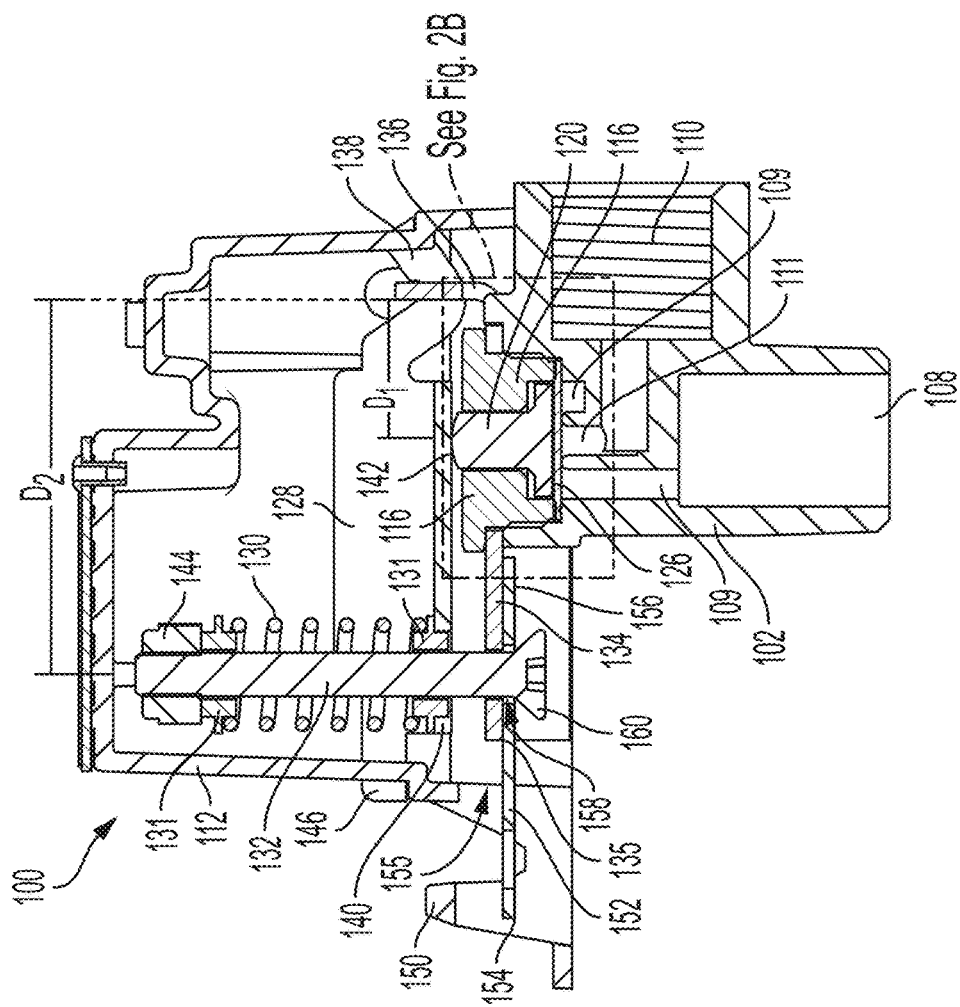
FIG. 2B
FIG. 2A

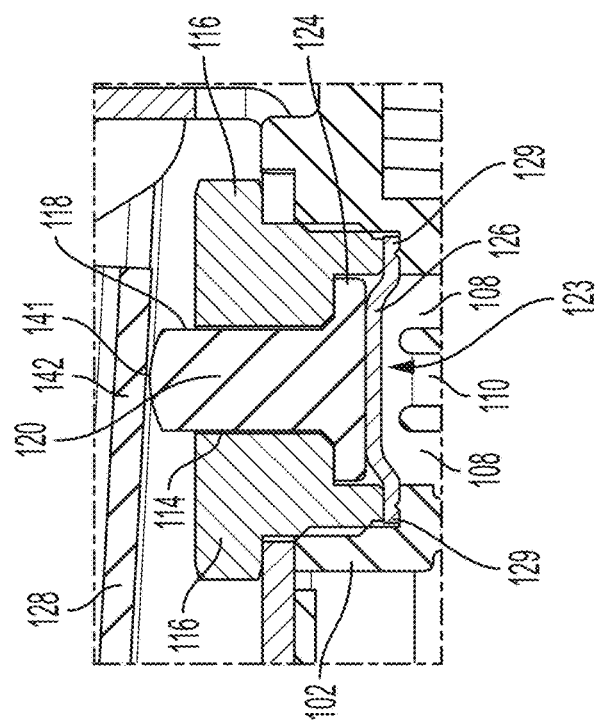
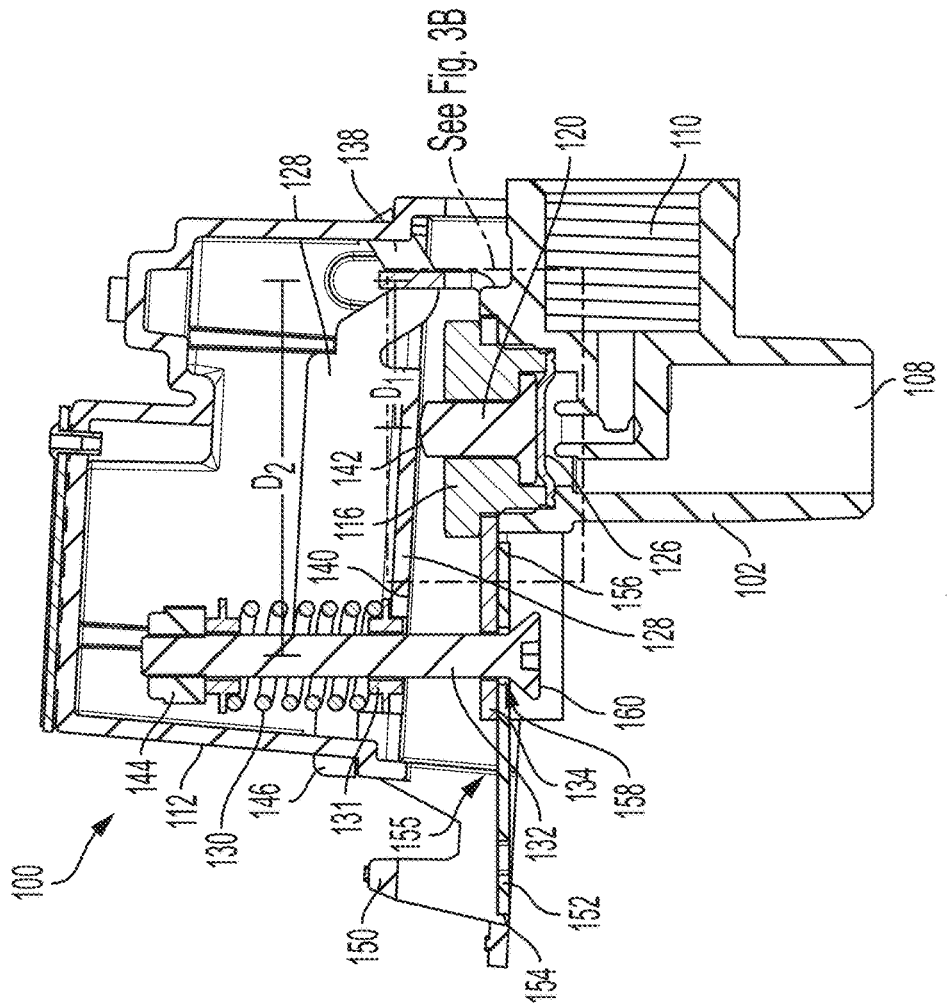
FIG. 3B
FIG. 3A

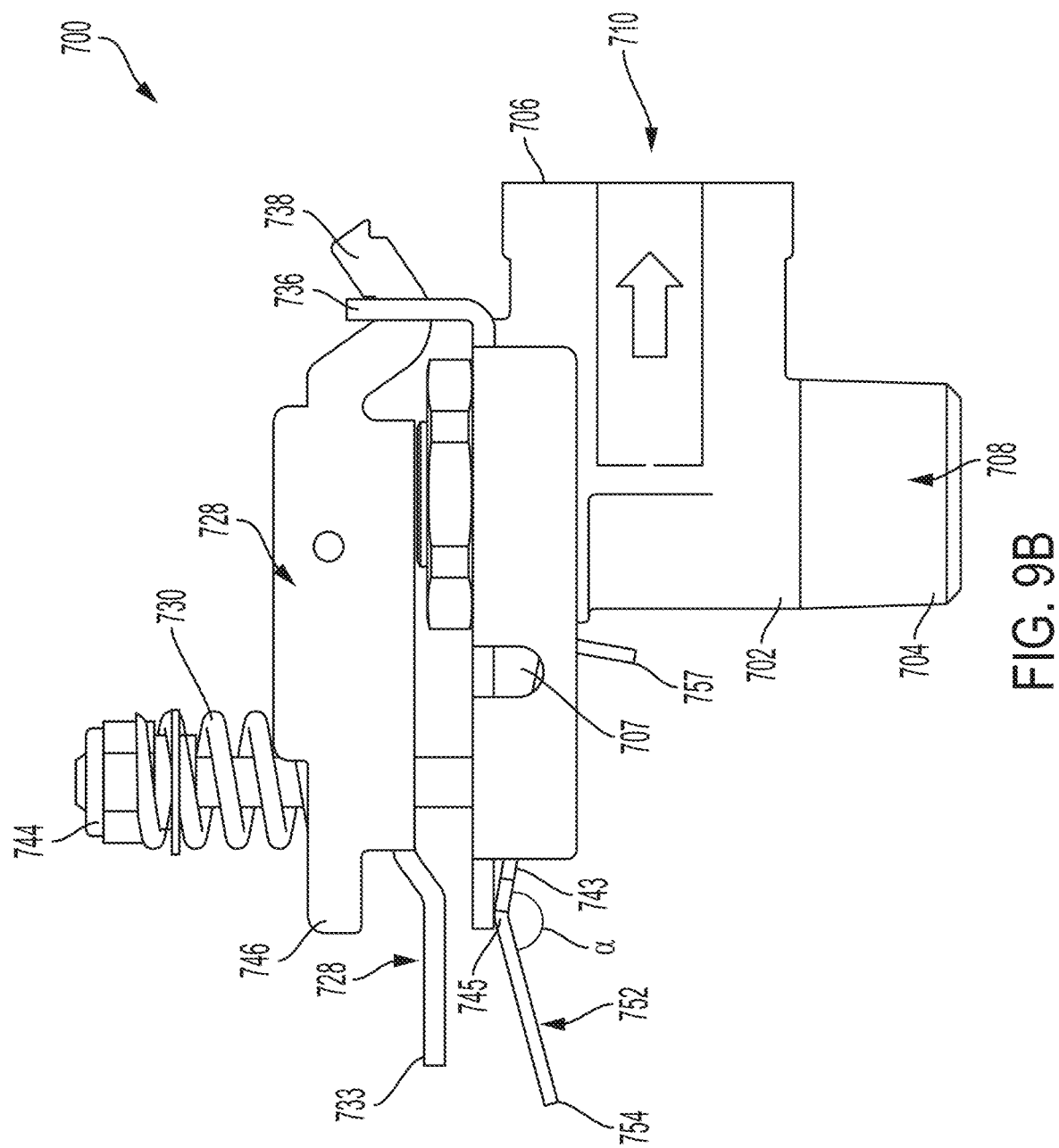

RELIEF VALVE WITH TESTING LOCKOUT

CROSS-REFERENCE

This application is a continuation-in-part of and claims the benefit of U.S. patent application Ser. No. 16/815,867, filed Mar. 11, 2020, the entirety of which is incorporated herein by reference.

FIELD OF THE TECHNOLOGY

The subject disclosure relates to fluid control valves and more particularly to relief valves within high pressure systems, such as fire protection systems.

BACKGROUND OF THE TECHNOLOGY

Fire protection systems for buildings generally include water supply and distribution systems for supplying water to sprinklers, or similar mechanisms, throughout a building. Pressure relief valves are included on the distribution systems to prevent unwanted pressure from building up and potentially damaging pipes, valves, or other parts of the fire protection system. Pressure relief valves generally remain closed when the local pressure is under a set threshold for the valve. When the pressure exceeds the threshold, the valve opens and fluid passes through the valve to drain out of the system, relieving pressure within the fire protection system.

As fire protection systems have become rated for higher pressures, there has become a need for higher pressure rated pressure relief valves for such systems. However, existing pressure relief valves have difficulty functioning within a high pressure fire protection system (e.g. 300 PSI) in such a way that the relief valves remain closed during normal operation while still reliably opening at pressure significantly exceeding the operating pressure of the system.

Further, testing for fire protection systems typically includes testing the system at a significantly higher pressure than the normal operation pressure to ensure safe, leak free operation. Testing the system at a high pressure can be difficult when the system includes numerous pressure relief valves, as the pressure relief valves are normally designed to open under high pressure, allowing fluid to pass to a drain to prevent the system from exceeding a set pressure. One way to avoid pressure relief valves opening during testing is to remove the pressure relief valves from the system entirely, but this can be extremely time consuming and can require draining the entire system. Alternatively, the system can be tested before any pressure relief valves are installed, but this requires changes to the initial installation that must be reversed after testing and does not allow for future testing. Another approach has been to include an additional valve between each pressure relief valve and the main water distribution line which can be closed to isolate the pressure relief valve from the water distribution line. This approach suffers from the drawback that a dedicated valve is required for each pressure relief valve, increasing cost and complexity of the system.

SUMMARY OF THE TECHNOLOGY

As such, there is a need for a fire protection valve that is affordable, effective in high pressure systems, and allows for easy testing of the fire protection system without requiring additional work and/or system components.

In light of the needs described above, in at least one aspect, the subject technology relates to a relief valve which can be used in a fire protection system, or other system, that is capable of operating within high pressure systems while still allowing for easy testing. The subject technology includes a lockout lever configured to maintain compression of a spring within a relief valve in order to increase a cracking pressure of the relief valve. Because testing of fire protection systems typically includes testing the system at a significantly higher pressure than the normal operation pressure to ensure safe, leak free operation, the increased cracking pressure of the relief valve ensures the relief valve can remain closed.

In one embodiment, the relief valve includes a valve body, a plunger assembly coupled to the valve body for selectively opening and closing the relief valve, and a support member secured to the valve body. The relief valve includes a lockout lever against the support member and forming a vertex. The relief valves includes a spring rod coupled to the lockout lever, and a spring coupled to the spring rod, providing a bias force against the plunger assembly to normally close the relief valve. In a lockout position, the lockout lever is moved to pivot on the vertex against the support member to further compress the spring, which increases the bias force and, in turn, a cracking pressure of the relief valve. The support member can define a lockout bore, the lockout bore transverse of depending sides of the support member. A tool extends into the lockout bore to contact the lockout lever for setting the lockout position to maintain the spring in a compressed configuration when the valve is in the closed position. Exemplary tools are a hex wrench, a tie wrap, a screwdriver and the like.

The lockout lever may include an effort arm that bends at a first angle relative to a resistance arm of the lockout lever. As such, the vertex is between the effort arm and resistance arm. In the lockout position, the lockout lever may be manually pulled, causing the vertex to make contact with the support member. The lockout lever may include a depending portion that bends at a right angle relative to a resistance arm of the lockout lever. In the lockout position, the resistance arm may pivot downward, pulling the spring rod down. The resistance arm may be configured to pivot flush against the support member in a first position, or pivot to separate from the support member in a second position.

The relief valve can have a bolthead coupled to or formed integrally with the spring rod. The bolthead maintains a connection between the spring rod and the lockout lever. The relief valve may include a lock nut on the spring rod configured to adjust compression of the spring thereon and thereby the cracking pressure of the relief valve.

In another aspect, the relief valve includes a flexible disk and a lever arm. The lever arm may have a fixed end pivotally coupled to the support member and a free end defining a spring rod hole. The valve body defines an adaptor opening with a bottom surface, an inlet flowpath at the bottom surface, and an outlet flowpath at the bottom surface. The flexible disk is located against the bottom surface for selectively sealing fluid communication between the inlet flowpath and the outlet flowpath. The plunger assembly may be slidably mounted for movement against the flexible disk. The spring may apply a closing force to the lever arm. In a closed position, the closing force on the lever arm may press the plunger against the flexible disk to seal the inlet flowpath and the outlet flowpath. In an open position, fluid passing into the inlet flowpath may overcome the closing force to deform the flexible disk so that the plunger moves the lever arm by overcoming the closing force, and in turn, the outlet flowpath is in fluid communication with the inlet flowpath.

The subject technology also relates to a normally closed relief valve including a body defining an inlet flowpath and an outlet flowpath. A plunger assembly selectively creates fluid communication between the inlet flowpath and the outlet flowpath. A support member is secured to the body. The normally closed relief valve also includes a lever arm having a fixed end pivotally coupled to the support member and biased against the plunger assembly in a closed position of the relief valve. In a flush position, the free end of the lever arm is rotated away from the plunger assembly to create a fluid communication between the inlet and outlet flowpath for clearing debris and ensuring that the plunger assembly is functioning properly.

In another aspect, the normally closed relief valve includes a flexible disk. The plunger assembly is slidably mounted for movement against the flexible disk. The body further defines an adaptor opening with a bottom surface, the inlet flowpath at the bottom surface, and the outlet flowpath at the bottom surface. The flexible disk is located against the bottom surface for selectively sealing fluid communication between the inlet flowpath and the outlet flowpath. The spring may apply a closing force to the lever arm. In a closed position, the closing force on the lever arm may press the plunger against the flexible disk to seal the inlet flowpath and the outlet flowpath. In an open position, fluid passing into the inlet flowpath may overcomes the closing force to deform the flexible disk so that the plunger moves the lever arm by overcoming the closing force, and in turn, the outlet flowpath is in fluid communication with the inlet flowpath. In a flush position, the lever arm may removes the force against the plunger so that the flexible disk creates the fluid communication between the inlet and outlet flow path.

In at least one aspect, the subject technology relates to a relief valve. The relief valve includes a body defining an inlet and outlet flowpath. The relief valve includes a support member secured to the body. The support member defines a lockout bore and also includes a proximal portion defining a spring rod opening and a distal portion. The relief valve includes a lockout lever against the support member, the lockout lever having a spring rod bore. The relief valve includes a lever arm having a fixed end pivotally coupled to the support member and a free end defining a spring rod hole. The relief valve also includes a spring rod which guides movement of a spring along an elongated length of the spring rod, the spring rod passing through the spring rod bore of the lockout lever, the spring rod opening of the support member, and the spring rod hole of the lever arm. In a lockout position, the lockout lever is moved to pull the spring rod causing further compression of the spring to increase a cracking pressure of the relief valve. In a flush position, the free end of the lever arm is moved upward to create a fluid communication between the inlet and outlet flowpath.

BRIEF DESCRIPTION OF THE DRAWINGS

So that those having ordinary skill in the art to which the disclosed system pertains will more readily understand how to make and use the same, reference may be had to the following drawings.

FIG. 2A is a vertical cross-sectional view of the valve of FIG. 1, taken from the center of the valve, with the valve in a closed position.

FIG. 2B is a zoomed-in view of a portion of the valve of FIG. 2A.

FIG. 3A is a vertical cross-sectional view of the valve of FIG. 1, taken from the center of the valve, with the valve in an open position.

FIG. 3B is a zoomed-in view of a portion of the valve of FIG. 3A.

FIGS. 9A-9B include a front perspective view and a side view of the relief valve of FIG. 7 in a locked-out position for testing.

DETAILED DESCRIPTION

Figure 1:
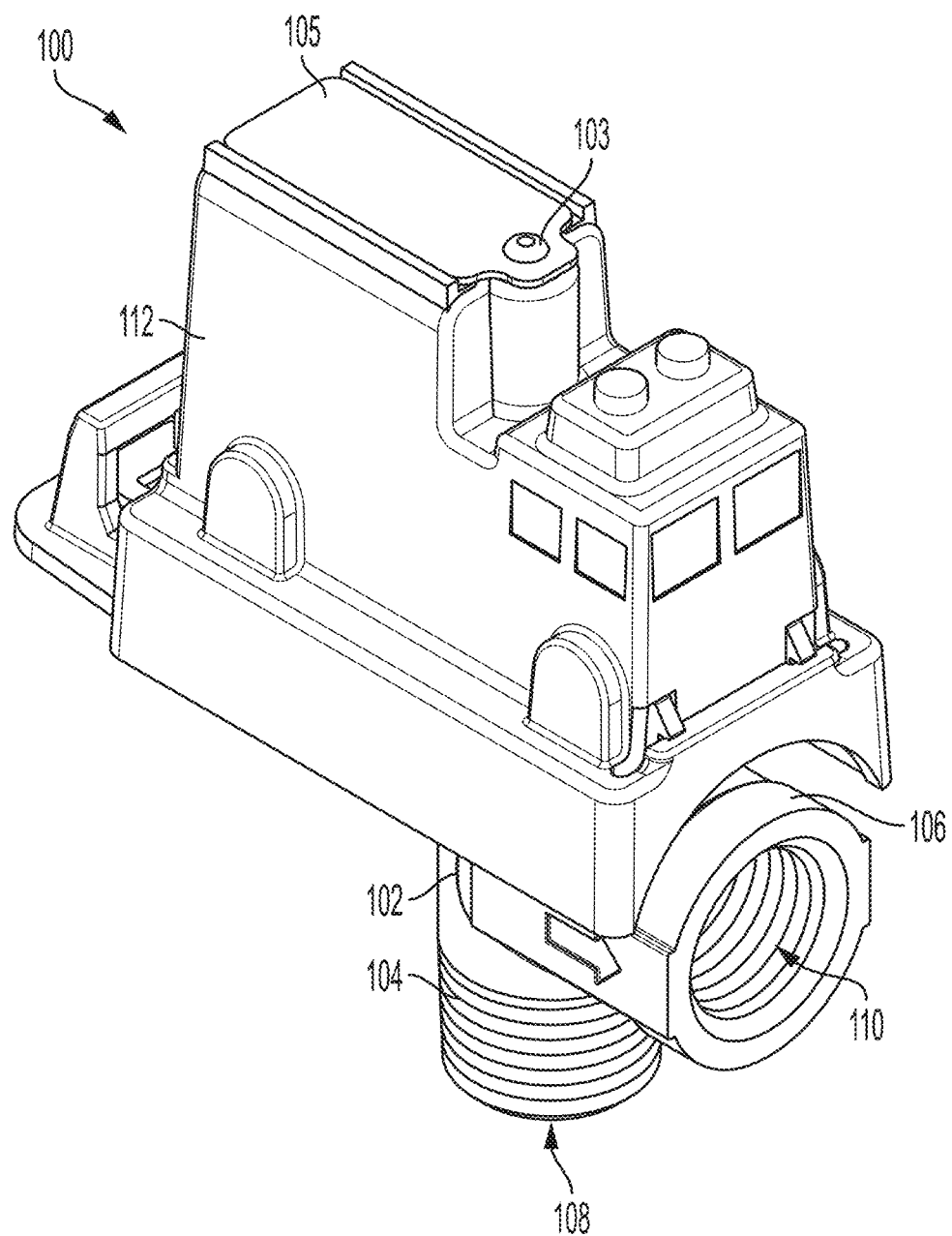
FIG. 1 is a front-side perspective view of a valve in accordance with the subject technology.

The subject technology overcomes many of the prior art problems associated with relief valves. In brief summary, the subject technology provides a reliable, high pressure rated relief valve with a lockout feature. The advantages, and other features of the systems and methods disclosed herein, will become more readily apparent to those having ordinary skill in the art from the following detailed description of certain preferred embodiments taken in conjunction with the drawings which set forth representative embodiments of the subject technology. Like reference numerals are used herein to denote like parts. Further, words denoting orientation such as "upper", "lower", "distal", and "proximal" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation).

Referring now to FIG. 1, a perspective view of a relief valve 100 in accordance with the subject technology is shown. The valve 100 has a body 102 which includes an inlet 104 and an outlet 106. The inlet 104 connects to a water pipe of a fire protection system (not distinctly shown), and forms an inlet flowpath 108 from the fire protection system into the valve 100. The outlet 106 connects to a drain pipe (not distinctly shown) or the like, forming an outlet flowpath 110 which passes water from the valve 100 to a drain. A cover 112 provides a protective housing for the inner workings of the valve 100, and also functions as part of a lockout feature, as will be discussed in more detail below. A faceplate 105 is secured to the top of the cover 112 by a screw 103. The faceplate 105 can include information about the valve 100, such the valve specifications, the valve manufacturer, a logo, or the like (not distinctly shown). Notably, while a fire protection system is used herein by way of example, it should be understood that the valve is equally suited for other systems, and particularly other high pressure water distribution systems.

Figure 6A:
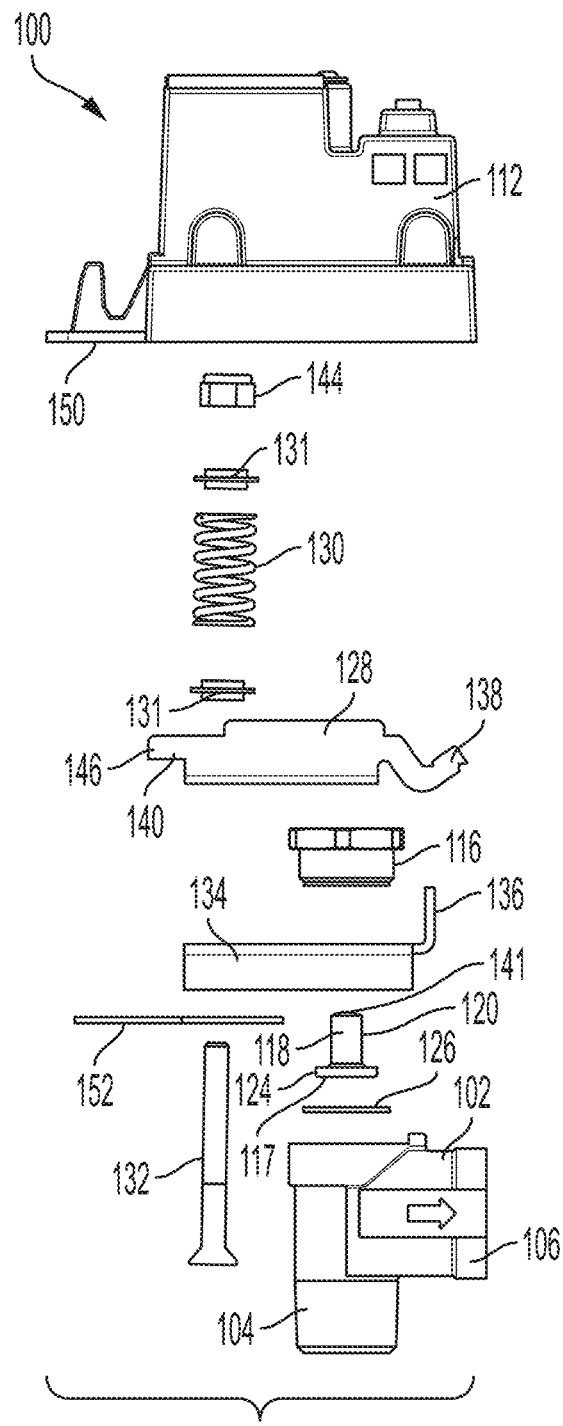
FIG. 6A is a side exploded view of the components of the valve of FIG. 1.
Figure 6B:
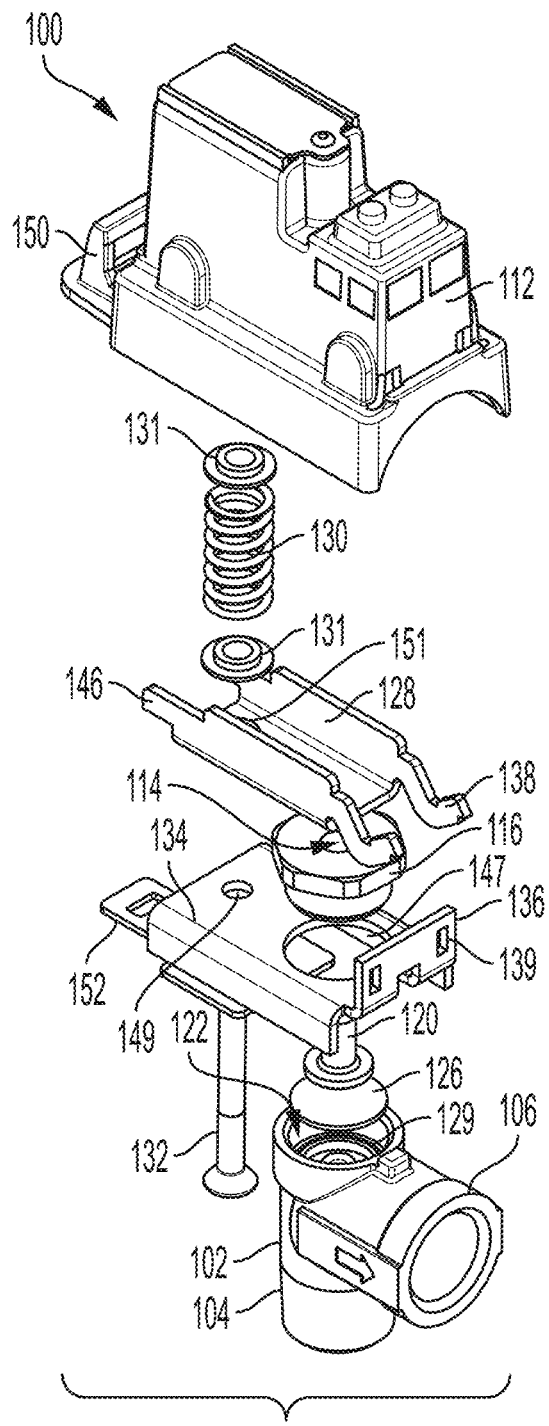
FIG. 6B is a perspective exploded view of the components of the valve of FIG. 1.

Referring now to FIGS. 2A, 2B, 3A, and 3B, vertical cross-sectional views from the center of the relief valve 100 are shown. In FIGS. 2A-2B, the valve 100 is shown in a closed position, while in FIGS. 3A-3B the valve 100 is shown in an open position with the lever arm 128 rotated upward, as will be discussed in more detail below. For clarity, exploded views of the valve 100 components can be seen in FIGS. 6A-6B.

The valve 100 includes a plunger assembly 120 with a disk 126. The plunger or plunger assembly 120 includes a plunger stem 118 and a plunger head 124. An adaptor 116 within the valve body 102 has an upper section 113 that forms a passage 114 which guides vertical movement of the stem 118. The passage 114 and plunger assembly 120 are sized and configured to create ample freedom of movement with robust repeatability without finicky alignment or a requirement of a large spring load.

The adaptor 116 also includes a lower section 115 which forms a circular cavity 122. Flow through the valve body 102 is controlled by the positioning the plunger assembly 120 within the cavity 122. In one embodiment, the adaptor 116 is integral with the valve body 102. As shown, the adaptor 116 threads into an opening 117 formed in the valve body 102. The adaptor 116 also has an upper flange 119.

The plunger assembly 120 includes a circular disk 126, adjacent to the plunger head 124 and fixed within the cavity 122 between the plunger head 124 and a seat surface 129 of the body 102. The lower section 115 of the adaptor 116 is shaped as a circular ring. Thus, as the adaptor 116 is threaded into the valve body 102, the lower section 115 presses the periphery of the disk 126 against the seat surface 129 to fix the disk 126 in place. As a result, the disk 126 is robustly sealed in place about the openings 109, 111 for very high pressure applications. Additionally, the disk 126 seals the moving parts (e.g., spring 130, lever arm 128, plunger head 128 etc.) so that moving parts are not exposed to water. As best seen in FIG. 3B, when the disk 126 flexes upward, a flowpath portion 123 of the cavity 122 is formed to create the fluid communication between the inlet flowpath 108 and the outlet flowpath 110. Still further, the disk 126 is set so that risk of damage during hydro testing is reduced.

Figure 5:
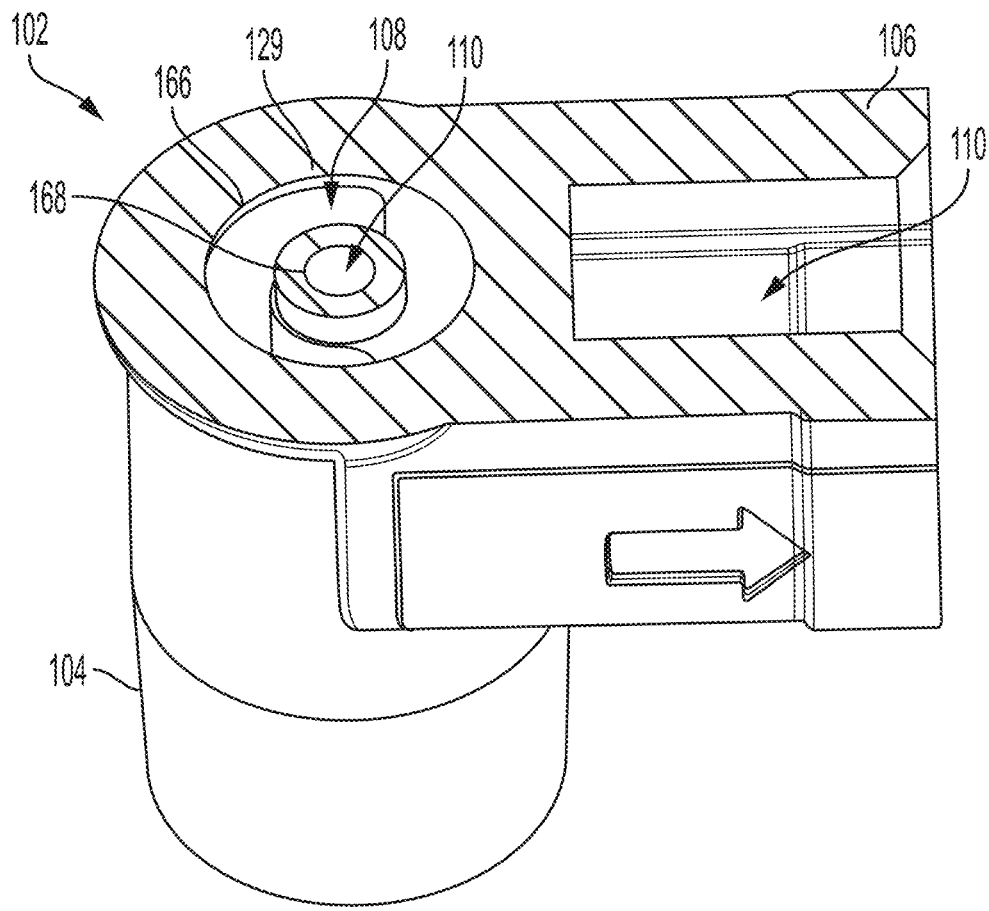
FIG. 5 is a horizontal cross section of the body of the valve of FIG. 1.

The disk 126 selectively seals the opening 109 to the inlet flowpath 108 and the opening 111 to the outlet flowpath 110. As best seen in FIGS. 2A and 3A, the openings 109, 111 into the cavity 122 are necked down compared to the respective inlet flowpath 108 and outlet flowpath 110. As best seen in FIG. 5, the inlet opening 109 forms an annular trough and the outlet opening 111 is a smaller circle centered in the inlet opening 109. However, there is still a large effective diaphragm area for opening the valve 100 by deflecting the disk 126 for opening pressure accuracy with the smaller diameter outlet opening 111 for faster reseating performance.

The disk 126 can be a rubber silicone, or the like, and forms a flexible membrane. In the closed position (FIGS. 2A-2B), the plunger head 124 of the plunger assembly 120 holds the disk 126 against the seat surface 129 of the cavity 122 to seal the opening 109 to the inlet flowpath 108 and opening 111 to the outlet flowpath 110 such that fluid does not pass through the valve body 102. During normal operation, when the pressure in the inlet channel 108 exceeds a predetermined cracking pressure for the valve 100, the valve 100 is forced into the open position (FIGS. 3A-3B). In such a case as sown in FIGS. 3A and 3B, fluid from the inlet channel 108 applies pressure to the disk 126, causing the disk 126 to flex and move the plunger assembly 120 upward, creating a fluid communication through the cavity 122 between the openings of the inlet flowpath 108 and the outlet flowpath 110. Fluid can then pass from the inlet flowpath 108, underneath the flexed disk 126, and to the outlet flowpath 110 to a drain. Notably, while the use of the disk 126 has been found to be advantageous, it should be noted that the disk 126 need not be used in all cases, and other mechanisms can be used to create a seal between the inlet and outlet flowpaths 108, 110 when the valve 100 is in the closed position.

Being designed for pressure relief, the valve 100 is configured to open, during normal operation, once pressure within the fire protection system (from the inlet flowpath 108) exceeds a predetermined pressure. In particular, the valve 100 is designed for use in a high pressure fire protection system (i.e. greater than 300 PSI), and therefore is configured to open only if the current pressure is greater than the expected operating pressure of the system by a reasonable margin. To help ensure that the valve 100 remains closed even when exposed to the high operating pressure of the system, a lever arm 128 is used in combination with a spring 130.

The spring 130 is positioned around a spring rod 132, which guides movement of the spring 130 along the elongated length of the spring rod 132. The spring rod 132 is fixedly connected to the valve body 102 by a support member 134. The spring rod 132 passes through a bore 149 in the support member 134 and a bore 151 in the lever arm 128. The support member 134 can be secured between the valve body 102 and the adaptor 116 such that the support member 134 is held in a fixed orientation with respect to the valve body 102. Preferably, the adaptor 116 passes through a large hole 147 in the support member 134. A flange 119 on the adaptor 116 captures the plate 134 against the valve body 102. The spring rod 132 is positioned on a first side of the plunger assembly 120, while the support member 134 forms a fulcrum plate 136 on the second, opposite side of the plunger assembly 120. The lever arm 128 has arms 138 seated in slots 139 in the fulcrum plate 136 to pivot vertically, with the fulcrum plate 136 as a fixed pivot point. The lever arm 128 extends between the fulcrum plate 136 and the spring 130. A second end 140 of the lever arm 128 is configured to engage a spring end fixture 131 coupled to the spring 130 such that the spring 130 resists vertical movement of the lever arm 128.

The top 141 of the plunger assembly 120 contacts an intermediate location 142 of the lever arm 128, between the fulcrum plate 136 and the spring 130. Therefore, when the plunger assembly 120 is forced upwards by fluid pressure from the inlet flowpath 108, the plunger assembly 120 contacts the lever arm 128 and urges the lever arm 128 to rotate vertically around the fulcrum plate 136. The upward force from the rotation of the lever arm 128 then urges the spring 130 to compress against an upper lock nut 144. Thus, the compression force of the spring 130 resists the pivoting motion of the lever arm 128 and maintains the valve 100 in the closed position unless the compression force of the spring 130 is overcome. Adjustments can be made to the lock nut 144 or spring rod 132 to increase or decrease the compression of the spring 130 in an at rest position, changing the cracking pressure required within the inlet 108 to open the valve 100. The spring 130 is shown at a default, exemplary level of compression in FIGS. 2A, 3A.

The positioning of the lever arm 128 provides a much greater moment at the spring 130 than at the plunger assembly 120 for the same amount of force. This is accomplished through the differences in where the spring 130 and plunger assembly 120 contact the lever arm 128, with respect to the fulcrum plate 136, which acts as the hinge for the lever arm 128. The spring 130 contacts the lever arm 128 at the second end 140 furthest from the fulcrum plate 136, while the plunger assembly 120 contacts the lever arm 128 at an intermediate point 142 on the lever arm 128. Therefore, the force from the plunger assembly 120, as a result of fluid pressure from the inlet flowpath 108, acts on the lever arm 128 at a much shorter distance D1 from the fulcrum plate 136 than the distance D2 between the fulcrum plate 136 and the spring 130. The spring 130 is able to match the moment in the lever arm 128 with a much smaller force than that applied to the lever arm 128 by the plunger assembly 120. This way, the valve 100 can maintain a closed position even when the pressure within the inlet flowpath 108 would ordinarily cause the spring 130 to compress in the case where no lever arm 128 were implemented. This advantageous positioning eliminates the need to provide a significantly more robust spring, or implement alternative options that could result in a costly and/or cumbersome valve, to allow the valve 100 to effectively operate effectively in a high pressure environment.

Figure 4B:
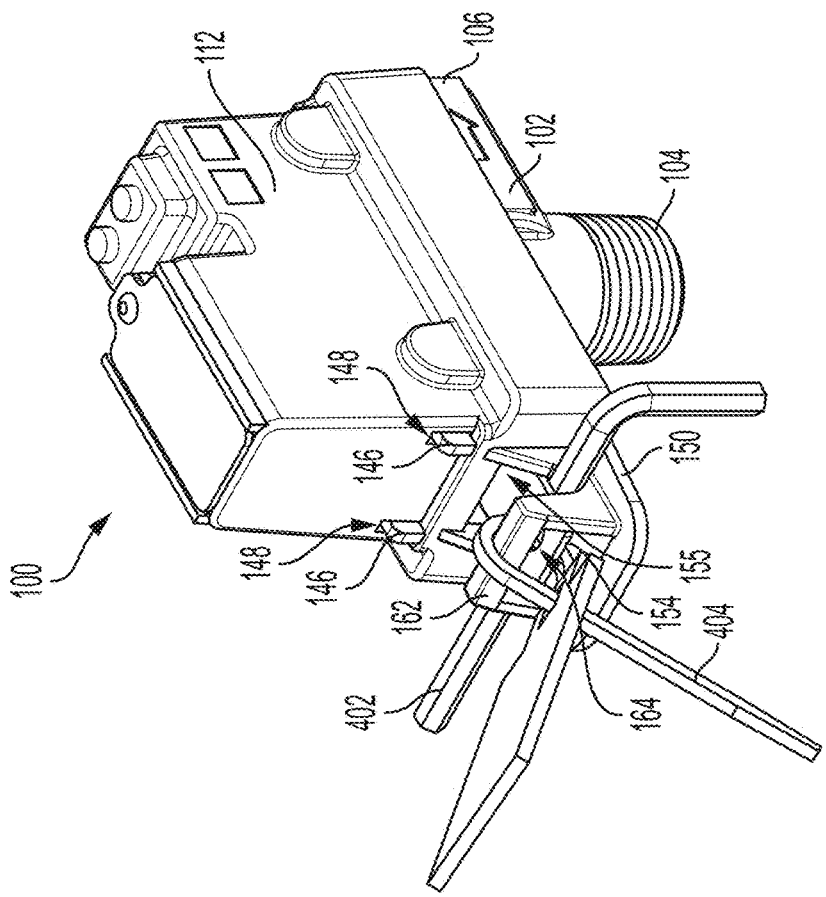
FIG. 4B is a rear-side view of the valve of FIG. 1 in a locked-out position for testing.
Figure 4A:
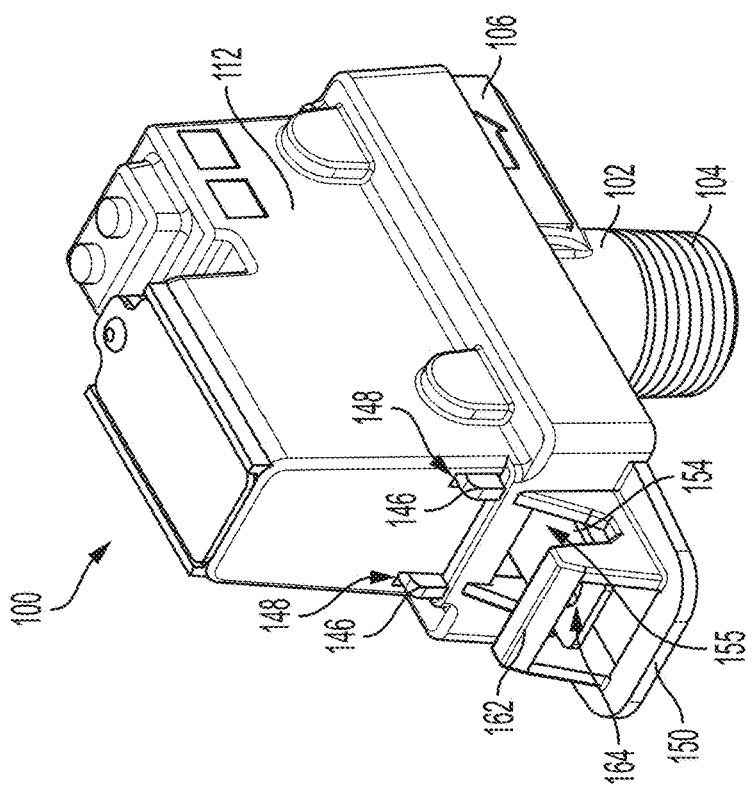
FIG. 4A is a rear-side view of the valve of FIG. 1.

Referring now to FIGS. 4A, 4B, perspective views of a fire protection valve 100 in accordance with the subject technology are shown. The fire protection valve 100 can be configured in accordance with the valves 100 discussed above, except as otherwise shown and described herein. As shown in FIGS. 4A, 4B, the valve 100 is in the closed position, and in FIG. 4B, a hex wrench 402 and tie wrap 404 are interlocked with the valve 100 to lock-out the valve 100, preventing the valve 100 from opening during testing of a fire protection system.

As can be seen in FIGS. 1-4B, the valve cover 112 engages with the lever arm 128. In particular, the second end 140 of the lever arm 128 forms two pins 146 which are seated within guide slots 148 of the cover 112, on the side of the cover 112 proximal the spring 130. On the same side of the cover 112, a tailgate 150 extends outwardly. When the valve 100 moves from the closed position of FIG. 2A to the open position of FIG. 3A, the pins 146 of the lever arm 128 act on the guides 148 of the cover 112 such that the cover 112 pivots upwards with the lever arm 128. In another embodiment, the guide slots 148 are sized so that the pins 146 simply move within the slots 148 and the cover remains stationary.

The pins 146 of the lever arm 128 being engaged in the slots 148 of the tailgate 150 allows the valve 100 to be manually flushed by lifting the tailgate 150, which in turn lifts the lever arm 128 and allows the plunger assembly 120 to move upward so that the disk 126 can easily deflect to open the valve 100. Manual flushing by lifting the tailgate 150 can help quickly and efficiently clear the valve 100 of debris, and/or ensure that the valve 100 has not become stuck during an extended period of non-use.

The valve 100 also includes a lower lockout lever 152, forming an effort arm 154, which extends out of a passage 155 in the cover 112 adjacent to the tailgate 150. On a resistance arm 156 of the lockout lever 152, the spring rod 132 runs through a spring rod bore 158 of the lockout lever 152. A wide lower bolthead 160 of the spring rod 132 secures the lockout lever 152 between the support member 134 and the spring rod 132. As the bolthead 160 is normally biased upward by the spring 130, the resistance arm 156 of the lockout lever 152 is also normally biased upward.

In order to lockout the valve 100, the lockout lever 152 is moved upwards at the effort arm 154, causing resistance arm 156 of the lockout lever 152 to pivot downward, with the end 135 of the support member 134 acting as an intermediate pivot point. The downward motion of the resistance arm 156 of the lockout lever 152 pulls the spring rod bolthead 160 down, further compressing the spring 130 against the lever arm 128. The hex wrench 402 can then be inserted between the tailgate 150 and the effort arm 154 of the lockout lever 152 to maintain this position. With the spring 130 compressed in this manner, the cracking pressure required from the inlet flowpath 108 to move the lever arm 128, and thus the spring 130, is greater. Therefore, the valve 100 can be locked out in this manner, increasing the cracking pressure above the test pressure required for testing the high pressure relief valve 100. The system can then be tested at a high pressure above the set cracking pressure without risk of the valve 100 opening.

Notably, while a hex rod 402 is given as an exemplary tool for locking out the valve 100, it should be understood that other functionally similar tools could also be used. For example, a screwdriver, bar, or other device could be inserted between the lockout lever 152 and tailgate 150 to hold the lockout lever 152 in the elevated, locked out state. The tailgate 150 also includes a support bar 162 and the lockout lever 152 includes a aperture 164 on the effort arm 154. As an additional or alternative lock out mechanism, the tie wrap 404 shown in FIG. 4B can be included. The tie wrap 404 loops through the aperture 164 in the lever arm 152 and around the support bar 162, locking with itself to hold the lockout lever 152 in the elevated position with respect to the tailgate 150. Notably, while the tie wrap 404 is shown as being used in addition to the hex wrench 402 in FIG. 4B, it should be understood that the tie wrap 404, or similar looping mechanism, could also be used as an alternative to the hex wrench 402. It is noteworthy that when the hex rod 402 and/or tie wrap 404 are removed, the valve automatically returns to the nominal setting without further user intervention.

Referring now to FIG. 5, a horizontal cross section of the valve body 102 taken from just below the cavity 122 is shown. The inlet flowpath 108 feeds into the cavity 122 through the inlet opening 166 in the valve body 102. Fluid can then flow out of the cavity 122 by entering the outlet flowpath 110 through the outlet opening 168. Notably, it can be a challenge to balance the flow of liquid into the cavity 122 from the inlet flowpath 108 and the flow of liquid out of the cavity 122 through outlet flowpath 110, since it is difficult for both flowpaths 108, 110 to feed to or from the center of the disk 126 and cavity 122. As such, in the example given, the outlet opening 168 is circular and positioned in the center of the valve body 102, which is also centrally within the cavity 122. The inlet opening 166 is ring-shaped, such that pressure from the inlet flowpath 108 acts on an extensive area of the disk 126. Further, the position of the inlet opening 166, surrounding the entire centrally placed outlet opening 168, allows pressure from the inlet flowpath 108 to act around the center of the disk 126, causing the disk 126 to flex and expand uniformly around the center while fluid can still easily flow between the inlet flowpath 108 and outlet flowpath 110.

Further, it should be noted that the tailgate 150, and related lockout and flush capabilities as shown and described in the above exemplary embodiments are optional features which need not be included in all cases. For example, in another embodiment, no tailgate 150 is included. The cover 112 still includes a passage 155 and support member 134 extends outward therefrom, adjacent to lower lockout lever 152. The effort arm 154 of the lockout lower lever arm 152 includes a downward bend spaced from the support member 134. Manually pushing the downward bend on the effort arm 154 upwards, such that the downward bend approaches support member 134, causes the lockout lever 152 to pivot around a contact point with the support member 134. This moves the bolthead 160 downward to further compress the spring 130, increasing the cracking pressure required to open the valve 100. The pivoting motion of the lower lockout lever 152 also causes the resistance arm 156 of the lower lockout lever 152 to separate from the support member 134. The cover 112 can include an opening adjacent the area of the separation. A tool can then be inserted into the opening such that the tool is wedged between the support member 134 and the resistance arm 156 of the lower lockout lever 152 to maintain the separation, ensuring increased cracking pressure during testing. Alternatively, the support member 134 includes an aperture so that a tie wrap can be used to retain the lever arm 152 in the locked out position. Further, the valve 100 may also include an extension of lever arm 128 which extends past the spring 130 and protrudes from the passage 155, such that the extension is accessible to a user. The extension of the lever arm 128 may then be lifted manually to flush the valve 100. Releasing the extension of the lever arm 128 will then allow the valve 100 to return to its normal position.

Figure 7:
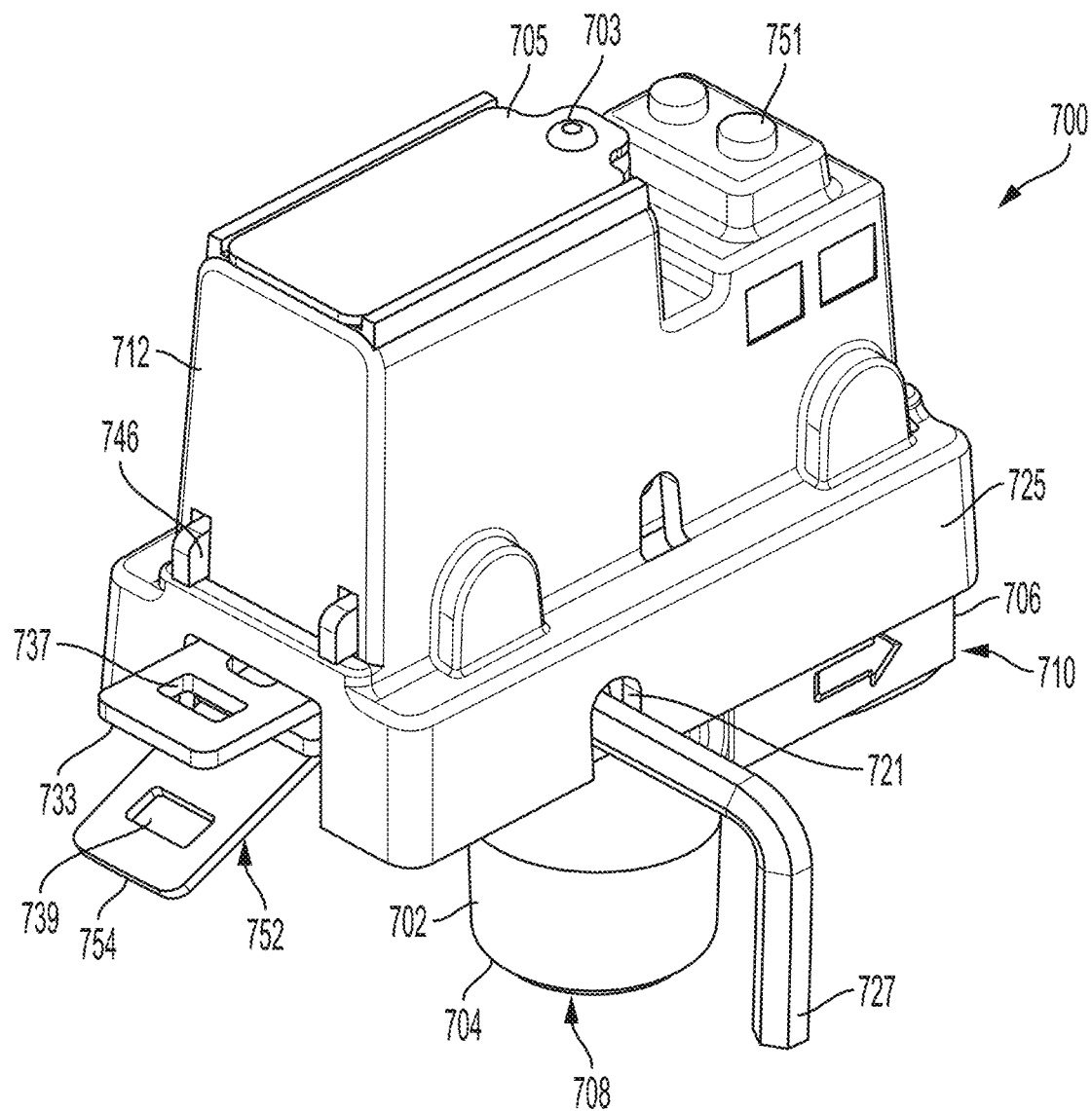
FIG. 7 is a rear, perspective view of a relief valve including a second implementation of the lockout position shown in accordance with the subject technology.

Referring now to FIG. 7, a perspective view of a relief valve 700 in accordance with the subject technology is shown. As will be appreciated by those of ordinary skill in the pertinent art, the relief valve 700 discussed herein utilizes similar principles to the relief valve 100 described above. Thus, like reference numbers in the "700" series are used to refer to like components whenever possible. The relief valve 700 differs from the relief valve 100 of FIGS. 1-6B in that a different lockout lever arrangement is employed and the following description is directed to these differences.

Similar to relief valve 100, relief valve 700 includes a body 702 defining an inlet 704 and an outlet 706. The inlet 704 connects to a water pipe of a fire protection system (not distinctly shown), and forms an inlet flowpath 708 from the fire protection system into the valve 700. The outlet 706 connects to a drain pipe (not distinctly shown) or the like, forming an outlet flowpath 710 which passes water from the valve 700 to the drain pipe. A cover 712 houses and protects the inner workings of the valve 700. A faceplate 705 is secured to the top of the cover 712 by a screw 703. The faceplate 705 can include information about the valve 700, such as the valve specifications and instructions, the valve manufacturer, a logo, or the like (not distinctly shown). Notably, while a fire protection system is used herein by way of example, it should be understood that the valve is equally suited for other systems, and particularly other high pressure water distribution systems.

Figure 8:
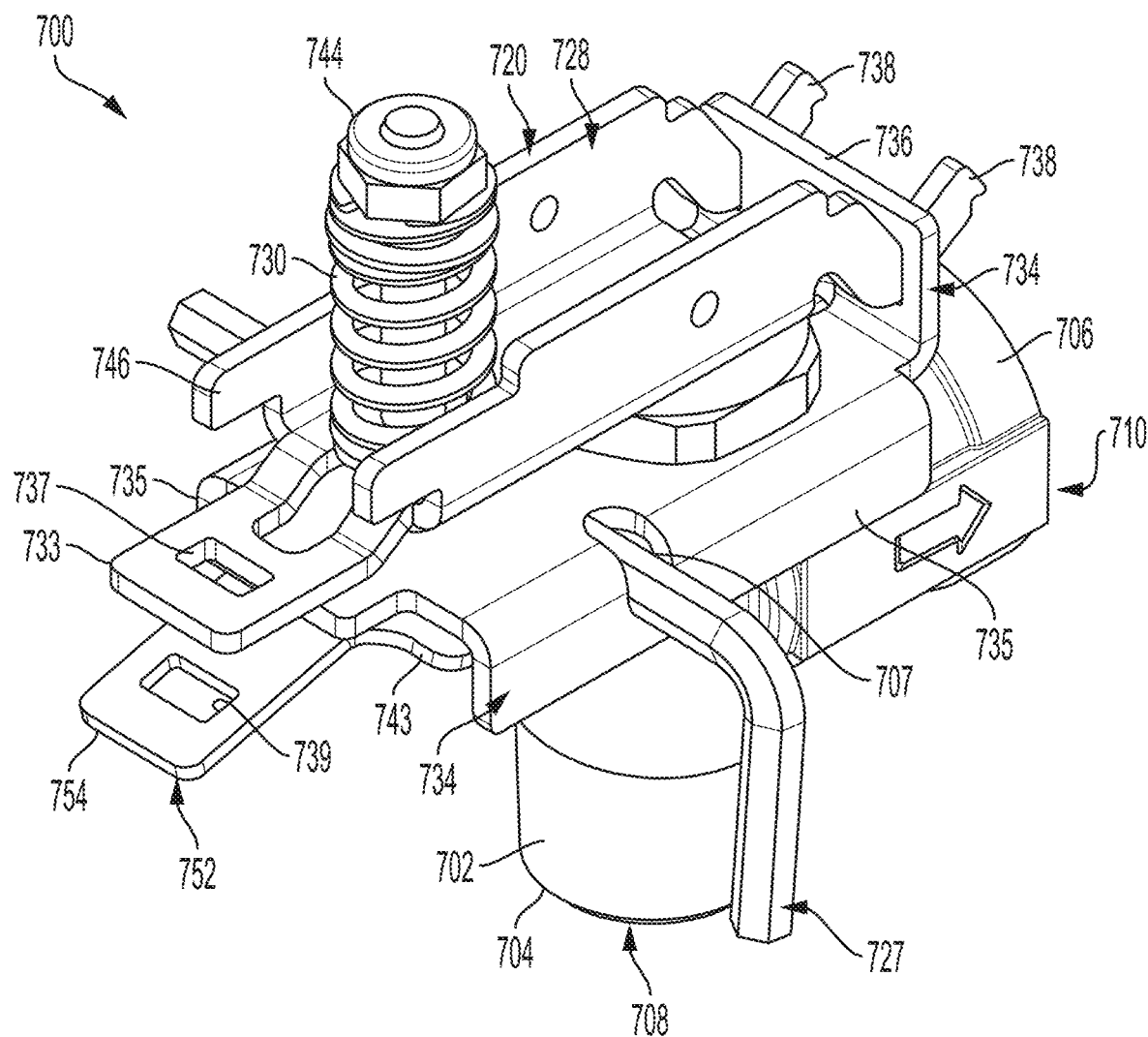
FIG. 8 is a rear, perspective view of the relief valve of FIG. 7 with the inner workings revealed.

Referring now to FIG. 8, a rear, perspective view of the relief valve 700 of FIG. 7 is shown. The cover 712 is omitted from the implementation shown in order to reveal inner workings of the relief valve 700. The normal operation of the valve 700 is very similar to the operation of the valve 100 discussed above. In brief overview, in the normally closed position, a spring 730 exerts a closing force on a plunger assembly 720 so that a lever arm 728 presses a plunger stem 718 so that a plunger head 724 is against a flexible disk 726 (shown best in FIG. 10) to seal the inlet flowpath 708 from the outlet flowpath 710. In the open position, fluid passing into the inlet flowpath 708 overcomes the closing force and deforms the flexible disk 726 to push the plunger head 724. As a result, the plunger stem 718 pushes the lever arm 728 to overcome the closing force of the spring 730. Thus, the outlet flowpath 710 is in fluid communication with the inlet flowpath 708.

The lever arm 728 pivotally couples to a support member 734 which is fixedly mounted to the body 702. The support member 734 has depending sides 735 that each define a portion of a transverse lockout bore 707. The cover 712 also forms apertures 721 in each side 725 aligned with the lockout bore 707 so a rod shaped structure, such as a hex wrench 727, can be inserted through the apertures 721 and lockout bore 707. The hex rod 727 maintains a lockout position of the relief valve 700, explained in greater detail below. While a hex rod 727 is given as an exemplary tool for locking out the relief valve 700, it should be understood that other functionally similar tools could also be used. For example, a screwdriver, bar, or other device could be utilized for setting the lockout position, wherein the lockout position maintains the spring 730 in a compressed configuration to increase a cracking pressure of the valve 700. In one embodiment, the cover 712 has a tailgate that may retain an implement to accomplish setting the lockout position or a mounting feature 751 for coupling a tool thereto.

Figure 9A:
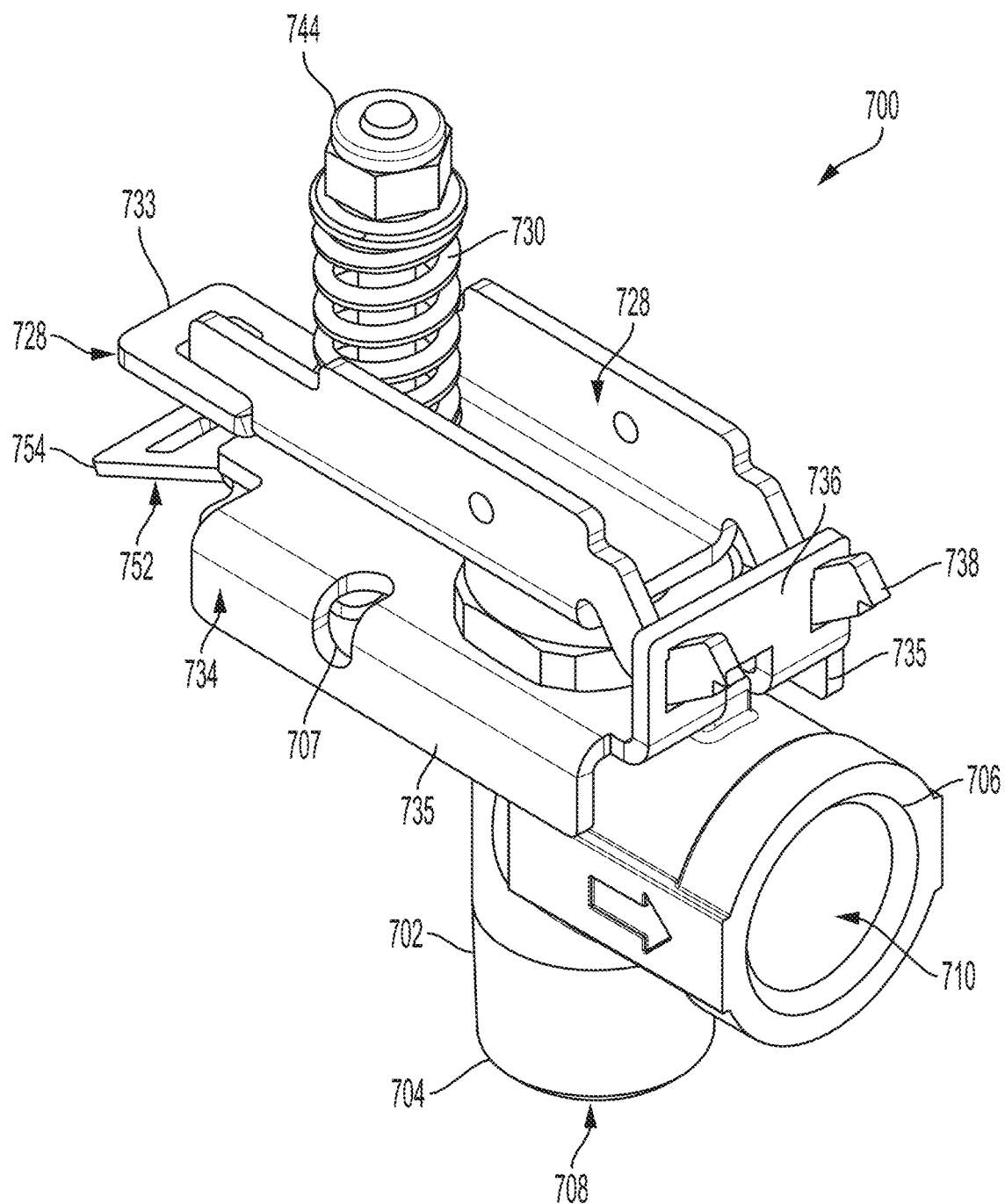

Referring now to FIGS. 9A and 9B, front and side perspective views of the relief valve 700 are shown. For purposes of explanation, the hex rod 727 of FIG. 8 is not shown in the lockout bore 707 but the relief valve 700 is otherwise in the lockout position. The valve 700 is configured to open once pressure within the fire protection system (from the inlet flowpath 708) exceeds a predetermined cracking pressure (e.g., normal operation). As noted above, manual flushing or opening the valve 700 can help quickly and efficiently clear the valve 700 of debris, and/or ensure that the valve 700 has not become stuck during an extended period of non-use. To this end, a free end 733 of the lever arm 728 includes an imprint of the word "FLUSH" to indicate to a technician how to manually flush the valve 700 by simply lifting upward on the free end 733 of the lever arm 728. This movement removes the force against the plunger stem 718 of the plunger assembly 720 so that the flexible membrane disk 726 creates a fluid communication between the inlet flowpath 708 and the outlet flowpath 710. The cover 712 may again move upward with the lever arm 728 or simply provide clearance for the upward motion.

Referring again to FIG. 7, as noted above, putting the valve 700 in a lockout position for hydro-testing quickly and easily is very efficient. To this end, an effort arm 754 of a lockout lever 752 includes an imprint of the word "HYDRO" to indicate to a technician how to manually put the valve 700 in the lockout position for hydro-testing as discussed in more detail below. The lockout lever 752 extends out of the cover 712, proximate to the free end 733 of the lever arm 728. The free end 733 and the effort arm 754 each form rectangular holes 737, 739. A tie wrap (not shown) may be utilized in the holes 737, 739 to put the valve in the lockout position by the same motion described below using a hex wrench.

Figure 10:
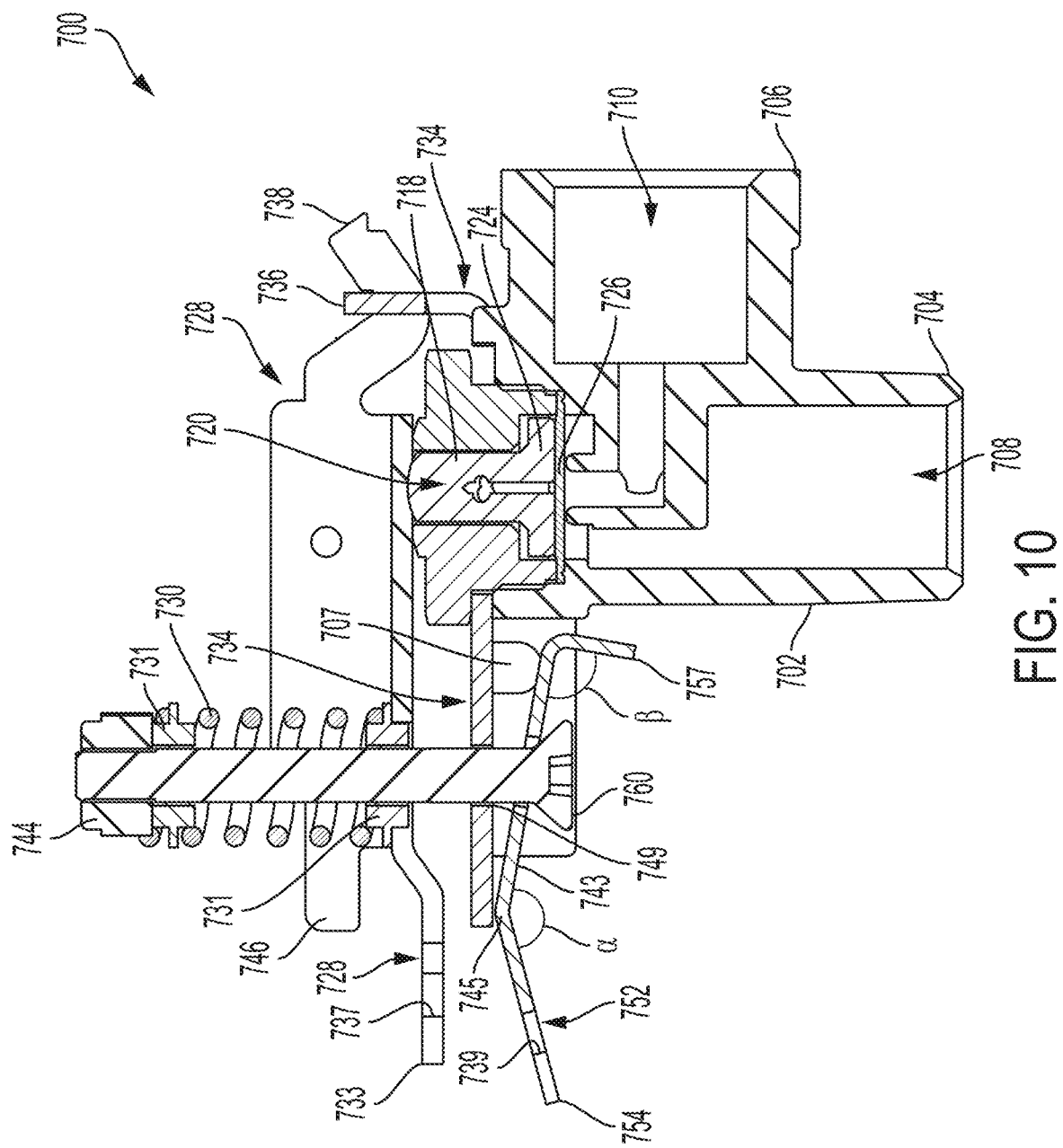
FIG. 10 is a cross-sectional view of the relief valve of FIGS. 9A-9B.

Referring now to FIG. 10, a cross-sectional view of the relief valve 700 is shown with the lockout lever 752 in the lockout position. The effort arm 754 of the lockout lever 752 bends at a first angle $\alpha$ relative to a resistance arm 743 of the lockout lever 752, forming a vertex 745 in the lockout lever 752. The resistance arm 743 bends at a right angle $\beta$ to form a depending portion 757. The depending portion 757 is somewhat flush against the body 702 so that inadvertent pushing downward of the effort arm 757 does not occur. In effect, the depending portion 757 acts as a travel stop in that direction. Alternatively, the lockout lever 752 may not have a depending portion. The lockout lever 752 may form a U-shape, an L-shape, a V-shape, and variations thereof, with one or more vertices formed therein.

In the normally closed position, the resistance arm 743 is pulled flush against the support member 734 by the spring force on the bolthead 760. In order to use a hex wrench to lockout the relief valve 700, the effort arm 754 of the lockout lever 752 is manually pulled upwards, causing the first fulcrum point or vertex 745 to make contact with the support member 734 acting as a fulcrum plate. As a result, resistance arm 743 of the lockout lever 752 pivots away from the support member. The motion of the resistance arm 743 pulls the spring rod bolthead 760 further into a spring rod opening 749 of the support member 734, further compressing the spring 730 against the lever arm 728. As a result, the spring compression force on the lever arm 728 of the plunger assembly 720 is increased to raise the cracking pressure of the valve 700.

When the resistance arm 743 seesaws downward to separate from the support member 734, the resistance arm 743 unblocks the lockout bore 707. Upon insertion of the hex wrench 727 through the apertures 721 and the lockout bore 707, the lockout position is maintained because the hex wrench 727 prevents return of the lockout lever 752, maintaining the orientation shown in FIG. 10. With the spring 730 further compressed and fixed in this manner, the cracking pressure required from the inlet flowpath 708 to move the lever arm 728, and thus still further compress the spring 730, is greater. Therefore, the valve 700 is locked out, increasing the cracking pressure above a test pressure required for testing the high pressure relief valve 700 and the technician is free to perform the testing. Thus, the entire system can then be tested at a high pressure above the set cracking pressure without risk of the valve 700 opening.

By removing the hex wrench 727, the resistance arm 743 rotates flush against the support member 734 so that the bolthead 760 moves toward the support member 734 and the spring 730 decompresses. In turn, the cracking pressure required from the inlet flowpath 708 to move the lever arm 728, and thus the compression of the spring 730, returns to a normal operating condition. As can be seen, the arrangement of valve 700 is relatively more compact and easy to move between positions.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A relief valve comprising:
    a valve body;
    a plunger assembly coupled to the valve body for selectively opening and closing the relief valve;
    a support member secured to the valve body;
    a lockout lever having an effort arm and a resistance arm with a vertex between the effort arm and the resistance arm, the lockout lever being mounted to seesaw with the vertex against the support member as a fulcrum plate;
    a spring rod coupled to the lockout lever; and
    a spring coupled to the spring rod and providing a bias force against the plunger assembly to normally close the relief valve,
    wherein in a lockout position, the effort arm of the lockout lever is moved to pivot on the vertex against the support member to further compress the spring, which increases the bias force and, in turn, a cracking pressure of the relief valve.

2. The relief valve of claim 1, wherein the support member has depending sides that define a transverse lockout bore.

3. The relief valve of claim 2, further comprising a tool extending into the lockout bore and configured to space the resistance arm of the lockout lever from the support member for setting the lockout position to maintain the spring in a compressed configuration when the valve is in the closed position, the tool selected from the group consisting of a hex wrench, a tie wrap, and a screwdriver.

4. The relief valve of claim 1, wherein the lockout lever further comprises a portion depending from the resistance arm that bends at a right angle to act as a travel stop against the valve body.

5. The relief valve of claim 1, wherein to move to the lockout position, the resistance arm pivots away from the support member.

6. The relief valve of claim 1, wherein in normal operation, the resistance arm is flush against the support member.

7. The relief valve of claim 1, further comprising a bolthead on the spring rod to maintain a connection between the spring rod and the lockout lever.

8. The relief valve of claim 1, further comprising a lock nut on the spring rod configured to selectively adjust the cracking pressure of the relief valve.

9. The relief valve of claim 1, further comprising:
    a flexible disk; and
    a lever arm having: a fixed end pivotally coupled to the support member; and a free end defining a spring rod hole,
    wherein:
    the valve body defines an adaptor opening with a bottom surface; an inlet flowpath at the bottom surface; and an outlet flowpath at the bottom surface;
    the flexible disk is located against the bottom surface for selectively sealing fluid communication between the inlet flowpath and the outlet flowpath;
    the plunger assembly is slidably mounted for movement against the flexible disk;
    the spring applies a closing force to the lever arm;
    in a closed position, the closing force on the lever arm presses the plunger against the flexible disk to seal the inlet flowpath and the outlet flowpath; and
    in an open position, fluid passing into the inlet flowpath overcomes the closing force to deform the flexible disk so that the plunger moves the lever arm by overcoming the closing force, and in turn, the outlet flowpath is in fluid communication with the inlet flowpath.

10. A relief valve comprising:
a body defining inlet and outlet flowpaths;
a support member secured to the body, the support member defining a lockout bore, the support member having a proximal portion defining a spring rod opening and a distal portion;
a lockout lever against the support member, the lockout lever having a spring rod bore;
a lever arm having: a fixed end pivotally coupled to the support member; and a free end defining a spring rod hole; and
a spring rod which guides movement of a spring along an elongated length of the spring rod, the spring rod passing through: the spring rod bore of the lockout lever, the spring rod opening of the support member, and the spring rod hole of the lever arm,
wherein:
in a lockout position, the lockout lever is moved to pull the spring rod causing further compression of the spring to increase a cracking pressure of the relief valve; and
in a flush position, the free end of the lever arm is moved upward to reduce spring force on the lever arm to create a fluid communication between the inlet and outlet flowpaths.

11. A relief valve as recited in claim 10, wherein the lockout bore is transverse a longitudinal extension of the support member and between the spring rod bore and the fixed end of the lever arm.

12. A relief valve as recited in claim 10, wherein the lockout lever arm has: a resistance arm flush against the support member in a normal operation position; an effort arm opposing the resistance arm; and a vertex point between the resistance arm and the effort arm that pivots against the support member as a fulcrum plate.

* * * * *